United States Patent
Matsuoka et al.

(10) Patent No.: US 10,409,129 B2
(45) Date of Patent: Sep. 10, 2019

(54) ELECTROCHROMIC ELEMENT

(71) Applicants: Yuto Matsuoka, Tokyo (JP); Tohru Yashiro, Kanagawa (JP); Hiroyuki Takahashi, Kanagawa (JP); Fuminari Kaneko, Kanagawa (JP); Sukchan Kim, Tokyo (JP); Mamiko Inoue, Kanagawa (JP)

(72) Inventors: Yuto Matsuoka, Tokyo (JP); Tohru Yashiro, Kanagawa (JP); Hiroyuki Takahashi, Kanagawa (JP); Fuminari Kaneko, Kanagawa (JP); Sukchan Kim, Tokyo (JP); Mamiko Inoue, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 212 days.

(21) Appl. No.: 15/486,747

(22) Filed: Apr. 13, 2017

(65) Prior Publication Data
US 2017/0329198 A1 Nov. 16, 2017

(30) Foreign Application Priority Data
May 11, 2016 (JP) ................................ 2016-095616
Jan. 20, 2017 (JP) ................................ 2017-008388

(51) Int. Cl.
*G02F 1/153* (2006.01)
*G02F 1/1503* (2019.01)
*G02F 1/155* (2006.01)
*C09K 9/02* (2006.01)
*C08F 222/22* (2006.01)
(Continued)

(52) U.S. Cl.
CPC .......... *G02F 1/1503* (2019.01); *C08F 222/22* (2013.01); *C09B 57/008* (2013.01); *C09B 69/109* (2013.01); *C09K 9/02* (2013.01); *G02F 1/155* (2013.01); *G02F 1/1523* (2013.01); (Continued)

(58) Field of Classification Search
CPC .................... G02B 27/0101; G02B 2027/0123
See application file for complete search history.

(56) References Cited

U.S. PATENT DOCUMENTS 5,408,344 A 4/1995 Takiguchi et al.
6,061,042 A 5/2000 Takahashi et al.
(Continued)

FOREIGN PATENT DOCUMENTS

JP 62-156172 7/1987
JP 62-290768 12/1987
(Continued)

OTHER PUBLICATIONS

U.S. Appl. No. 15/372,651, filed Dec. 8, 2016.
(Continued)

*Primary Examiner* — Joseph P Martinez
(74) *Attorney, Agent, or Firm* — Oblon, McClelland, Maier & Neustadt, L.L.P.

(57) ABSTRACT

An electrochromic element is provided. The electrochromic element includes a first electrode, a second electrode facing the first electrode with a gap therebetween, and a color developing layer disposed between the first electrode and the second electrode. The color developing layer includes an electrochromic compound that develops and discharges color by a redox reaction and a compound having an adsorption group adsorptive to the first electrode.

6 Claims, 2 Drawing Sheets

(51) Int. Cl.
*C09B 57/00* (2006.01)
*C09B 69/10* (2006.01)
*G02F 1/1523* (2019.01)
*G02F 1/15* (2019.01)

(52) U.S. Cl.
CPC ......... *C09K 2211/1007* (2013.01); *C09K 2211/1014* (2013.01); *G02F 2001/1502* (2013.01)

(56) References Cited

U.S. PATENT DOCUMENTS

| | | | |
|---|---|---|---|
| 6,151,093 A | 11/2000 | Takiguchi et al. | |
| 6,320,571 B1 | 11/2001 | Takahashi et al. | |
| 2001/0005246 A1 | 6/2001 | Takiguchi et al. | |
| 2005/0259986 A1* | 11/2005 | Kaneiwa | B82Y 20/00 396/506 |
| 2006/0204866 A1 | 9/2006 | Hirano et al. | |
| 2007/0024948 A1 | 2/2007 | Hirano et al. | |
| 2008/0013152 A1 | 1/2008 | Hirano et al. | |
| 2009/0231663 A1 | 9/2009 | Hirano et al. | |
| 2011/0222139 A1 | 9/2011 | Naijo et al. | |
| 2011/0279884 A1 | 11/2011 | Fujimura et al. | |
| 2012/0033286 A1 | 2/2012 | Yashiro et al. | |
| 2012/0050838 A1 | 3/2012 | Hirano et al. | |
| 2012/0154892 A1 | 6/2012 | Yashiro et al. | |
| 2012/0194894 A1 | 8/2012 | Yashiro et al. | |
| 2013/0258439 A1 | 10/2013 | Naijo et al. | |
| 2013/0335802 A1 | 12/2013 | Kim et al. | |
| 2014/0078569 A1 | 3/2014 | Takahashi et al. | |
| 2014/0268284 A1 | 9/2014 | Naijo et al. | |
| 2015/0168796 A1 | 6/2015 | Yashiro et al. | |
| 2015/0198857 A1 | 7/2015 | Yashiro et al. | |
| 2015/0274761 A1 | 10/2015 | Sagisaka et al. | |
| 2015/0331295 A1 | 11/2015 | Takahashi et al. | |
| 2015/0378233 A1 | 12/2015 | Fujimura et al. | |
| 2016/0005375 A1 | 1/2016 | Naijo et al. | |
| 2016/0108072 A1 | 4/2016 | Inoue et al. | |
| 2016/0209721 A1 | 7/2016 | Matsumoto et al. | |
| 2016/0349590 A1 | 12/2016 | Ohshima et al. | |
| 2017/0010514 A1 | 1/2017 | Yashiro et al. | |

FOREIGN PATENT DOCUMENTS

| | | |
|---|---|---|
| JP | 2002-287172 | 10/2002 |
| JP | 2007-171781 | 7/2007 |
| JP | 3955641 | 8/2007 |
| JP | 2008-116718 | 5/2008 |
| JP | 2009-217054 | 9/2009 |
| JP | 2010-160370 | 7/2010 |
| WO | WO 98/035267 A1 | 8/1998 |

OTHER PUBLICATIONS

U.S. Appl. No. 15/375,824, filed Dec. 12, 2016.
U.S. Appl. No. 15/315,970, filed Dec. 2, 2016.
U.S. Appl. No. 15/315,103, filed Nov. 30, 2016.
U.S. Appl. No. 15/502,367, filed Feb. 7, 2017.

\* cited by examiner

FIG. 4

| CLASSIFICATION | 0 | 1 | 2 | 3 | 4 | 5 |
|---|---|---|---|---|---|---|
| DESCRIPTION OR APPEARANCE | THE EDGES OF THE CUTS ARE COMPLETELY SMOOTH; NONE OF THE SQUARES OF THE LATTICE IS DETACHED. | | | | | ANY DEGREE OF FLAKING THAT CANNOT EVEN BE CLASSIFIED BY CLASSIFICATION 4. |

ELECTROCHROMIC ELEMENT

CROSS-REFERENCE TO RELATED APPLICATIONS

This patent application is based on and claims priority pursuant to 35 U.S.C. § 119(a) to Japanese Patent Application No. 2016-095616 and 2017-008388, filed on May 11, 2016 and Jan. 20, 2017, respectively, in the Japan Patent Office, the entire disclosure of each of which is hereby incorporated by reference herein.

BACKGROUND

Technical Field

The present disclosure relates to an electrochromic element.

Description of the Related Art

Electrochromic materials are known for reversibly transiting between a transparent state and a colored state by an electrochemical redox reaction. Electrochromic materials are generally applied to electrochromic elements (e.g., electronic paper, display) and electrochromic light control elements (e.g., light control lens, light control window, light shielding filter, anti-glare mirror).

Electrochromic elements are non-light-emitting elements that put less burden to the eyes. Electrochromic elements are capable of displaying images even in a transparent state and applicable to very thin elements such as film. Electrochromic elements are expected as novel image displaying elements. Electrochromic elements are also expected as practical energy-saving technology.

A basic configuration of an electrochromic element includes two electrodes facing each other with a gap therebetween, and a color developing layer containing an electrochromic compound that is sandwiched between the two electrodes.

A conventional electrochromic element has a drawback that the adhesion between the electrode and the color developing layer is weak. Thus, the color developing layer is easily detached from the electrode when the element is burdened by a force or heat when processed, or by folding in a case in which the element is formed on a flexible substrate, resulting in an electrical and physical disconnection of the element.

SUMMARY

In accordance with some embodiments of the present invention, an electrochromic element is provided. The electrochromic element includes a first electrode, a second electrode facing the first electrode with a gap therebetween, and a color developing layer disposed between the first electrode and the second electrode. The color developing layer includes an electrochromic compound that develops and discharges color by a redox reaction and a compound having an adsorption group adsorptive to the first electrode.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4 is a classification of test results for the Cross-cut Adhesion Test.

Figure 1:
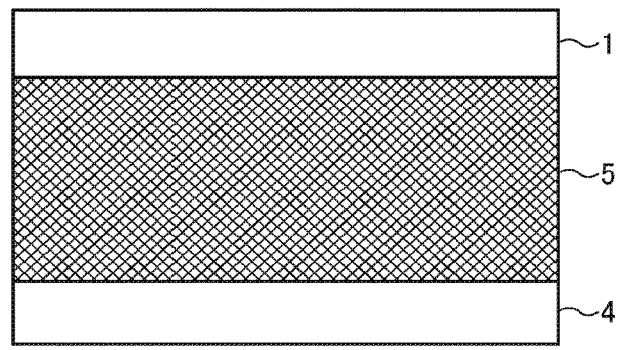
FIG. 1 is a schematic cross-sectional view of an electrochromic element according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

In accordance with some embodiments of the present invention, an electrochromic element is provided that expresses excellent color developing and discharging property owing to a high adhesion between the electrode and the color developing layer.

Electrochromic Element

The electrochromic element according an embodiment of the present invention includes a first electrode, a second electrode facing the first electrode with a gap therebetween, and a color developing layer disposed between the first electrode and the second electrode. The color developing layer includes: an electrochromic compound that develops and discharges color by a redox reaction; and a compound having an adsorption group adsorptive to the first electrode. The element may further include other layers, if needed.

The electrochromic element according to an embodiment of the present invention is provided based on the inventors' finding that the adhesion between the color developing or electrochromic layer and the electrode cannot be improved by way of a conventional method of improving the adhesion between a liquid-crystal electrolyte layer and the electrochromic layer.

The liquid-crystal electrolyte layer has an improved adhesion to the electrochromic layer for its fluidity. However, the liquid-crystal electrochromic layer never exerts an influence on the interface between the electrochromic layer and the electrode, because the crystal-liquid electrolyte layer is in contact with the electrochromic layer. Accordingly, the adhesion between the electrochromic layer and the electrode cannot be improved by the fluidity of the electrolyte layer.

Color Developing Layer

The color developing layer is not limited in configuration so long as the electrochromic compound that develops and discharges color by a redox reaction and the compound having an adsorption group adsorptive to the first electrode are included therein. According to a first embodiment, the color developing layer consists of a single color developing layer. According to a second embodiment, the color developing layer includes a first electrochromic layer in contact with the first electrode, and an electrolyte layer. According to a third embodiment, the color developing layer includes a first electrochromic layer in contact with the first electrode, an electrolyte layer, and a second electrolyte layer in contact with the second electrode.

Color Developing Layer According to First Embodiment

According to the first embodiment, the color developing layer consists of a single color developing layer that includes the electrochromic compound, the compound having an adsorption group adsorptive to the first electrode, an electrolyte, an electrolyte solvent, and a binder, and optionally includes other components, if needed.

Electrochromic Compound

Examples of the electrochromic compound include compounds that develop color by at least one of a reduction reaction and an oxidation reaction.

Electrochromic Compound Developing Color by Reduction Reaction

Examples of the electrochromic compounds that develop color by a reduction reaction include, but are not limited to, polymer-based or dye-based electrochromic compounds. Specific examples of such electrochromic compounds include, but are not limited to, low-molecular-weight organic electrochromic compounds such as azobenzene compounds, anthraquinone compounds, diarylethene compounds, dihydroprene compounds, dipyridine compounds, styryl compounds, styrylspiropyran compounds, spirooxazine compounds, spirothiopyran compounds, thioindigo compounds, tetrathiafulvalene compounds, terephthalic acid compounds, triphenylmethane compounds, triphenylamine compounds, naphthopyran compounds, viologen compounds, pyrazoline compounds, phenazine compounds, phenylenediamine compounds, phenoxazine compounds, phenothiazine compounds, phthalocyanine compounds, fluoran compounds, fulgide compounds, benzopyran compounds, or metallocene compounds; and conductive polymer compounds such as polyaniline and polythiophene. Each of these compounds can be used alone or in combination with others. Among these compounds, viologen compounds and dipyridine compounds are preferable since they express excellent color development-discharge potential and color values.

A viologen compound may be used in combination with a titanium oxide particle. By combining a viologen compound and a titanium oxide particle, advantageously, optical density and contrast can be maintained high.

A dipyridine compound represented by the following formula A1 is preferable since it expresses excellent color values.

Fomula A1

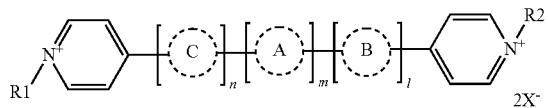

In the formula A1, each of R1 and R2 independently represents a substituted or unsubstituted alkyl or aryl group having 1 to 8 carbon atoms, while at least one of R1 and R2 has a substituent selected from COOH, $PO(OH)_2$, and $Si(OC_kH2_{k+1})_3$, where k represents a numeral in the range of 1 to 20.

In the formula A1, X represents a monovalent anion. The monovalent anion is not limited to a particular ion so long as it forms a stable pair with a cationic part. Specific examples of the monovalent anion include, but are not limited to, Br ion ($Br^-$), Cl ion ($Cl^-$), $ClO_4$ ion ($ClO_4^-$), $PF_6$ ion ($PF_6^-$), and $BF_4$ ion ($BF_4^-$).

In the formula A1, each of n, m, and l independently represents 0, 1, or 2. In the formula A1, each of A, B, and C independently represents a substituted or unsubstituted alkyl, aryl, or heterocyclic group having 1 to 20 carbon atoms.

Electrochromic Compound Developing Color by Oxidation Reaction

Examples of the electrochromic compounds that develop color by an oxidation reaction include, but are not limited to, triarylamine-containing compounds, azobenzene compounds, tetrathiafulvalene compounds, triphenylmethane compounds, triphenylamine compounds, and leuco dyes. Among these compounds, triarylamine-containing compounds are preferable since they express a low color development-discharge potential and excellent color values.

Preferably, the content rate of the electrochromic compound in the color developing layer is in the range of from 0.5% to 30% by mass.

Compound Having Adsorption Group Adsorptive to First Electrode

Specific examples of the adsorption group adsorptive to the first electrode include, but are not limited to, hydroxyl group, phenyl group, nitrile group, carboxy group, sulfonic group, amino group, pyridyl group, sulfate group, phosphonate group, phosphate group, and a polar functional group derived from phosphate group. Each of these groups can be included in the compound alone or in combination with others. Among these groups, phosphate group is preferable for its high adhesion to the first electrode (ITO).

The compound having an adsorption group adsorptive to the first electrode may be selected from either synthesized products or commercialized products. Specific examples of the commercialized products include, but are not limited to, KAYAMER PM-21 and KAYAMER PM-2 (both available from Nippon Kayaku Co., Ltd.).

The electrochromic compound itself may function as the compound having an adsorption group adsorptive to the first electrode, or alternatively, the electrochromic compound and the compound having an adsorption group adsorptive to the first electrode may independently exist as separate compounds.

Preferably, the content rate of the compound having an adsorption group adsorptive to the first electrode in the color developing layer is in the range of from 0.5% to 20% by mass.

Binder

Specific examples of the binder include, but are not limited to, polyethylene oxide polymer, polyvinyl alcohol polymer, polyacrylonitrile polymer, methacrylate polymer, acrylate polymer, and vinylidene fluoride polymer.

Electrolyte

Specific examples of the electrolyte include, but are not limited to: inorganic ion salts such as alkali metal salts and alkali-earth metal salts; quaternary ammonium salts; and supporting salts of acids and bases. More specifically, $LiClO_4$, $LiBF_4$, $LiAsF_6$, $LiPF_6$, $LiCF_3SO_3$, $LiCF_3COO$, KCl, $NaClO_3$, NaCl, $NaBF_4$, NaSCN, $KBF_4$, $Mg(ClO_4)_2$, and $Mg(BF_4)_2$, can be used.

In addition, ionic liquids can also be used as the electrolyte. In particular, organic ionic liquids are preferable because they have a molecular structure that exhibits liquidity in a wide temperature range including room temperature.

Specific examples of cationic components in such organic ionic liquids include, but are not limited to, imidazole derivatives (e.g., N,N-dimethylimidazole salt, N,N-methylethylimidazole salt, N,N-methylpropylimidazole salt), pyridinium derivatives (e.g., N,N-dimethylpyridinium salt, N,N-methylpropylpyridinium salt), and aliphatic quaternary ammonium salts (e.g., trimethylpropylammonium salt, trimethylhexyl ammonium salt, triethylhexylammonium salt).

From the aspect of stability in the atmosphere, specific preferred examples of anionic components in such organic ionic liquids include, but are not limited to, fluorine-containing compounds such as $BF_4^-$, $CF_3SO_3^-$, $PF_4^-$, and $(CF_3SO_2)_2N^-$.

Ionic liquids which combining the above-described cationic and anionic components are preferably used as the electrolyte.

The ionic liquid may be directly dissolved in a photopolymerizable monomer, an oligomer, or a liquid crystal material. When solubility is poor, the ionic liquid may be first dissolved in a small amount of a solvent, and thereafter mixed with a photopolymerizable monomer, an oligomer, or a liquid crystal material.

Specific examples of the solvent include, but are not limited to, propylene carbonate, acetonitrile, γ-butyrolactone, ethylene carbonate, sulfolane, dioxolan, tetrahydrofuran, 2-methyltetrahydrofuran, dimethylsulfoxide, 1,2-dimethoxyethane, 1,2-ethoxymethoxyethane, polyethylene glycol, alcohols, and mixed solvents thereof.

Preferably, the content rate of the electrolyte in the color developing layer is in the range of from 1% to 50% by mass.

Electrolyte Solvent

Specific examples of the electrolyte solvent include, but are not limited to, propylene carbonate, acetonitrile, γ-butyrolactone, ethylene carbonate, sulfolane, dioxolan, tetrahydrofuran, 2-methyl tetrahydrofuran, dimethylsulfoxide, 1,2-dimethoxyethane, 1,2-ethoxymethoxyethane, polyethylene glycol, alcohols, and mixed solvents thereof.

Other Components

Examples of the other components include, but are not limited to, a solvent, a plasticizer, a polymerization initiator, a leveling agent, a sensitizer, a dispersant, a surfactant, an antioxidant, and a filler.

The single color developing layer according to the first embodiment may be formed on the first electrode by coating the first electrode with a coating liquid including the electrochromic compound, the compound having an adsorption group adsorptive to the first electrode, the electrolyte, the electrolyte solvent, the binder, and the other components, if any. In particular, the color developing layer can be formed by spin coating, casting, micro gravure coating, gravure coating, bar coating, roll coating, wire bar coating, dip coating, slit coating, capillary coating, spray coating, nozzle coating, or various printing methods, such as gravure printing, screen printing, flexo printing, offset printing, reverse printing, and inkjet printing.

Preferably, the single color developing layer according to the first embodiment has an average thickness of from 1 to 100 am, and more preferably from 5 to 50 μm.

Color Developing Layer According to Second Embodiment

The color developing layer according to the second embodiment includes a first electrochromic layer in contact with the first electrode, and an electrolyte layer.

First Electrochromic Layer

The first electrochromic layer in contact with the first electrode includes the electrochromic compound that develops and discharges color by a redox reaction and the compound having an adsorption group adsorptive to the first electrode, and optionally includes other components, if needed. Preferably, the first electrochromic layer further includes a radical polymerizable compound.

Examples of the electrochromic compound that develops and discharges color by a redox reaction include, but are not limited to, triarylamine-containing radical polymerizable compounds, azobenzene compounds, tetrathiafulvalene compounds, triphenylmethane compounds, triphenylamine compounds, and leuco dyes. Among these compounds, triarylamine-containing radical polymerizable compounds are preferable.

Examples of the triarylamine-containing radical polymerizable compounds include a compound represented by the following formula 1.

$$A_n\text{-}B_m \qquad \text{Formula 1}$$

In the formula 1, when n is 2, m is 0; and when n is 1, m is 0 or 1. At least one of A and B has a radical polymerizable functional group. A is represented by the following formula 2, and one of $R_1$ to $R_{15}$ is bound to B. B is represented by the following formula 3, and one of $R_{16}$ to $R_{21}$ is bound to A.

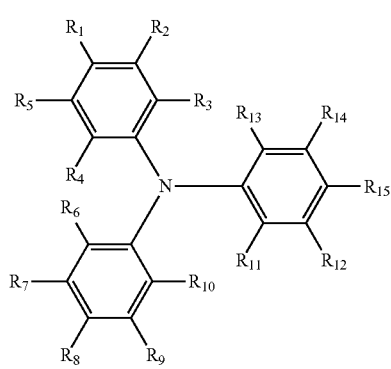

Formula 2

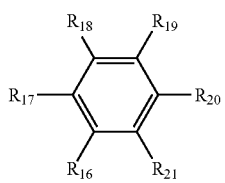

Formula 3

In the formulae 2 and 3, each of $R_1$ to $R_{21}$ independently represents a monovalent organic group, and at least one of the monovalent organic groups is a radical polymerizable functional group.

Monovalent Organic Group

Specific examples of the monovalent organic group in the formulae 2 and 3 include, but are not limited to, a hydrogen atom, a halogen atom, hydroxyl group, nitro group, cyano group, carboxyl group, a substituted or unsubstituted alkoxycarbonyl group, a substituted or unsubstituted aryloxycarbonyl group, a substituted or unsubstituted alkylcarbonyl group, a substituted or unsubstituted arylcarbonyl group, amide group, a substituted or unsubstituted monoalkylaminocarbonyl group, a substituted or unsubstituted dialkylaminocarbonyl group, a substituted or unsubstituted monoarylaminocarbonyl group, a substituted or unsubstituted diarylaminocarbonyl group, sulfonic acid group, a substituted or unsubstituted alkoxysulfonyl group, a substituted or unsubstituted aryloxysulfonyl group, a substituted or unsubstituted alkylsulfonyl group, a substituted or unsubstituted arylsulfonyl group, sulfoneamide group, a substituted or unsubstituted monoalkylaminosulfonyl group, a substituted or unsubstituted dialkylaminosulfonyl group, a substituted or unsubstituted monoarylaminosulfonyl group, a substituted or unsubstituted diarylaminosulfonyl group, amino group, a substituted or unsubstituted monoalkylamino group, a substituted or unsubstituted dialkylamino group, a substituted or unsubstituted alkyl group, a substituted or unsubstituted alkenyl group, a substituted or unsubstituted alkynyl group, a substituted or unsubstituted aryl group, a substituted or unsubstituted alkoxy group, a substituted or unsubstituted aryloxy group, a substituted or unsubstituted alkylthio group, a substituted or unsubstituted arylthio group, and a substituted or unsubstituted heterocyclic group.

Among these groups, alkyl group, alkoxy group, hydrogen atom, aryl group, aryloxy group, halogen atom, alkenyl group, and alkynyl group are preferred, from the aspect of stable behavior.

Specific examples of the halogen atom include, but are not limited to, fluorine atom, chlorine atom, bromine atom, and iodine atom.

Specific examples of the alkyl group include, but are not limited to, methyl group, ethyl group, propyl group, and butyl group.

Specific examples of the aryl group include, but are not limited to, phenyl group and naphthyl group.

Specific examples of the aralkyl group include, but are not limited to, benzyl group, phenethyl group, and naphthylmethyl group.

Specific examples of the alkoxy group include, but are not limited to, methoxy group, ethoxy group, and propoxy group.

Specific examples of the aryloxy group include, but are not limited to, phenoxy group, 1-naphthyloxy group, 2-naphthyloxy group, 4-methoxyphenoxy group, and 4-methylphenoxy group.

Specific examples of the heterocyclic group include, but are not limited to, carbazole, dibenzofuran, dibenzothiophene, oxadiazole, and thiadiazole.

The substituent may be further substituted with a substituent, such as a halogen atom, nitro group, cyano group, an alkyl group (e.g., methyl group, ethyl group), an alkoxy group (e.g., methoxy group, ethoxy group), an aryloxy group (e.g., phenoxy group), an aryl group (e.g., phenyl group, naphthyl group), and an aralkyl group (e.g., benzyl group, phenethyl group).

Radical Polymerizable Functional Group

Here, the radical polymerizable functional group is defined as a radical polymerizable group having a carbon-carbon double bond.

Specific examples of the radical polymerizable functional group include, but are not limited to, 1-substituted ethylene functional groups and 1,1-substituted ethylene functional groups.

Specific examples of the 1-substituted ethylene functional groups include, but are not limited to, a functional group represented by the following formula (i).

Formula (i)

In the formula (i), $X_1$ represents a substituted or unsubstituted arylene group, a substituted or unsubstituted alkenylene group, —CO— group, —COO— group, or —CON($R_{100}$)— group (where $R_{100}$ represents a hydrogen atom, an alkyl group, an aralkyl group, or an aryl group), or —S— group.

Specific examples of the arylene group in the formula (i) include, but are not limited to, a substituted or unsubstituted phenylene group and naphthylene group.

Specific examples of the alkenylene group in the formula (i) include, but are not limited to, ethenylene group, propenylene group, and butenylene group.

Specific examples of the alkyl group in the formula (i) include, but are not limited to, methyl group and ethyl group.

Specific examples of the aralkyl group in the formula (i) include, but are not limited to, benzyl group, naphthylmethyl group, and phenethyl group.

Specific examples of the aryl group in the formula (i) include, but are not limited to, phenyl group and naphthyl group.

Specific examples of the radical polymerizable functional group represented by the formula (i) include, but are not limited to, vinyl group, styryl group, 2-methyl-1,3-butadienyl group, vinyl carbonyl group, acryloyloxy group, acryloylamide group, and vinyl thioether group.

Specific examples of the 1,1-substituted ethylene functional groups include, but are not limited to, a functional group represented by the following formula (ii).

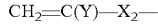

Formula (ii)

In the formula (ii), Y represents a substituted or unsubstituted alkyl group, a substituted or unsubstituted aralkyl group, a substituted or unsubstituted aryl group, a halogen atom, cyano group, nitro group, an alkoxy group, or —COOR$_{101}$ group (where $R_{101}$ represents a hydrogen atom, a substituted or unsubstituted alkyl group, a substituted or unsubstituted aralkyl group, a substituted or unsubstituted aryl group, or CONR$_{102}$R$_{103}$ (where each of $R_{102}$ and $R_{103}$ independently represents a hydrogen atom, a substituted or unsubstituted alkyl group, a substituted or unsubstituted aralkyl group, or a substituted or unsubstituted aryl group)). $X_2$ represents a substituent, such as those exemplified for $X_1$ in the formula (i), a single bond, or an alkylene group. At least one of Y and $X_2$ represents oxycarbonyl group, cyano group, an alkenylene group, or an aromatic ring.

Specific examples of the aryl group in the formula (ii) include, but are not limited to, phenyl group and naphthyl group.

Specific examples of the alkyl group in the formula (ii) include, but are not limited to, methyl group and ethyl group.

Specific examples of the alkoxy group in the formula (ii) include, but are not limited to, methoxy group and ethoxy group.

Specific examples of the aralkyl group in the formula (ii) include, but are not limited to, benzyl group, naphthylmethyl group, and phenethyl group.

Specific examples of the radical polymerizable functional group represented by the formula (ii) include, but are not limited to, α-acryloyloxy chloride group, methacryloyloxy group, α-cyanoethylene group, α-cyanoacryloyloxy group, α-cyanophenylene group, and methacryloyl amino group.

$X_1$, $X_2$, and Y may be further substituted with a substituent, such as a halogen atom, nitro group, cyano group, an alkyl group (e.g., methyl group, ethyl group), an alkoxy group (e.g., methoxy group, ethoxy group), an aryloxy group (e.g., phenoxy group), an aryl group (e.g., phenyl group, naphthyl group), and an aralkyl group (e.g., benzyl group, phenethyl group).

In particular, acryloyloxy group and methacryloyloxy group are preferred as the radical polymerizable functional group.

Specific preferred examples of the triarylamine-containing radical polymerizable compounds include compounds represented by the following formulae 1-1 to 1-3.

Formula 1-1

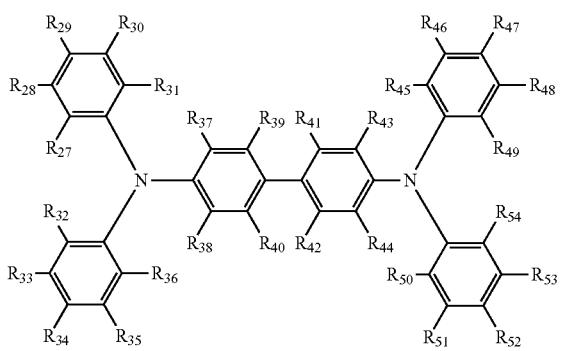

Formula 1-2

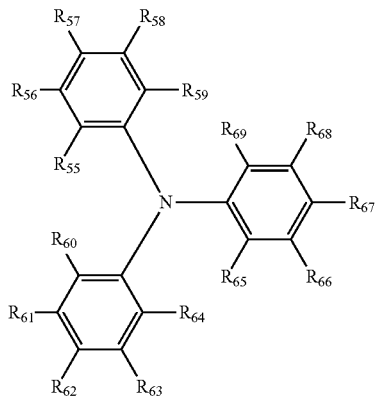

Formula 1-3

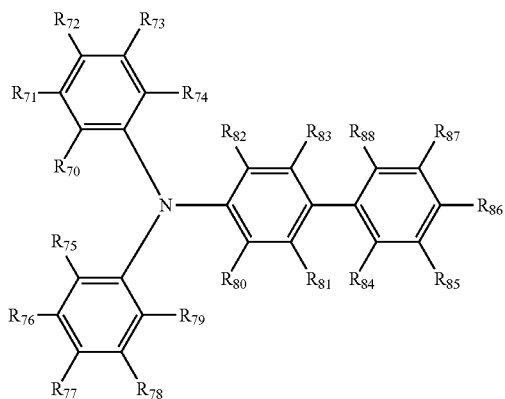

In the formulae 1-1 to 1-3, each of $R_{27}$ to $R_{88}$ independently represents a monovalent organic group, and at least one of the monovalent organic groups is a radical polymerizable functional group.

Specific examples of the monovalent organic group and the radical polymerizable functional group include those exemplified for the formula 2 and 3.

Specific examples of the triarylamine-containing radical polymerizable compounds represented by the formulae 1-1 to 1-3 include the following compounds, but are not limited thereto.

Example Compound 1

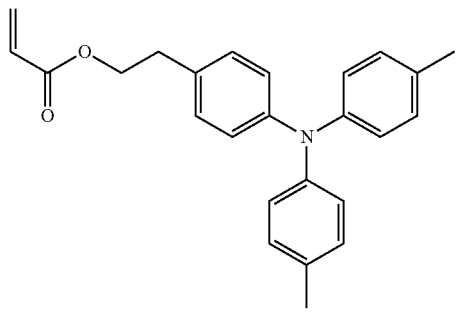

Example Compound 2

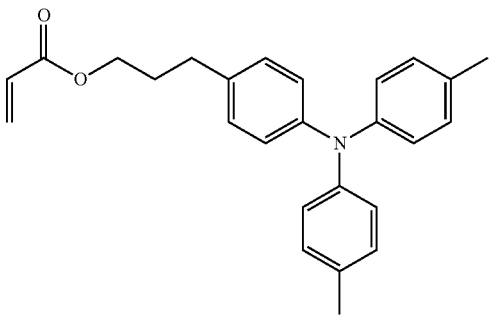

-continued
Example Compound 3
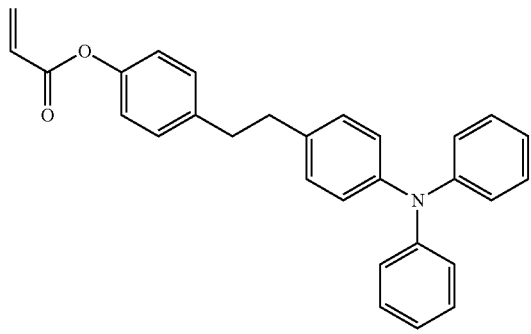
Example Compound 4
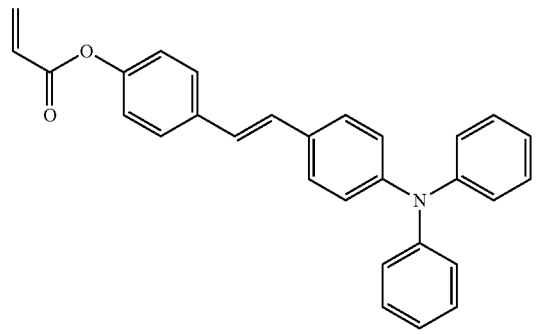
Example Compound 5
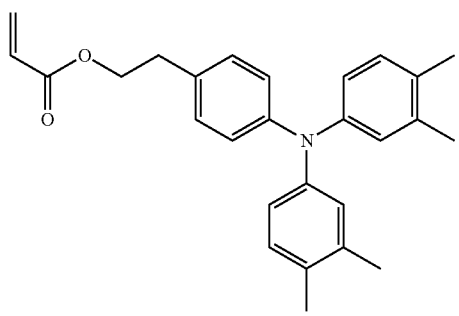
Example Compound 6
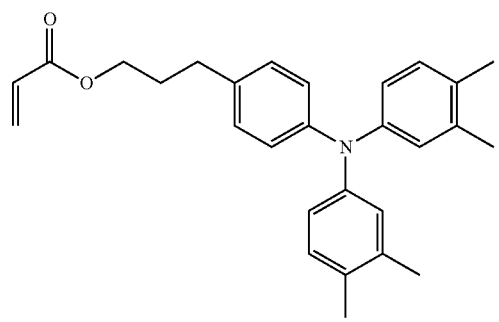
Example Compound 7
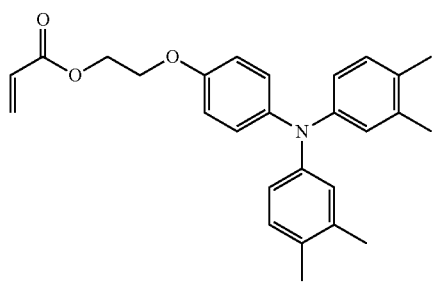
Example Compound 8
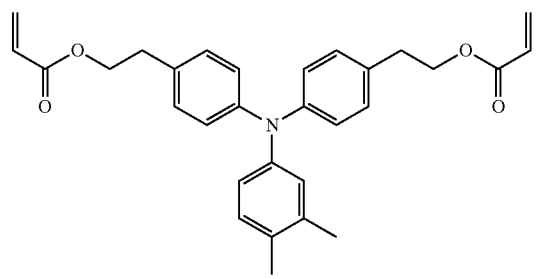
Example Compound 9
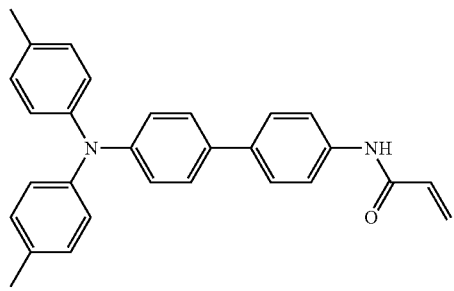
Example Compound 10
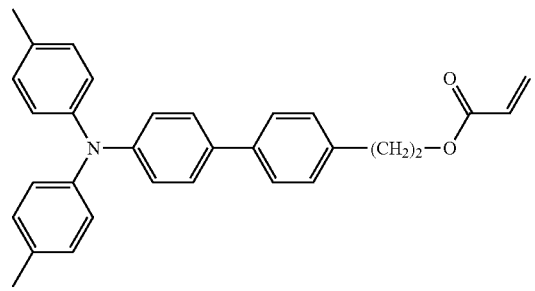
Example Compound 11
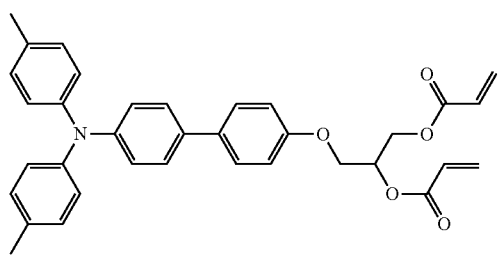
Example Compound 12
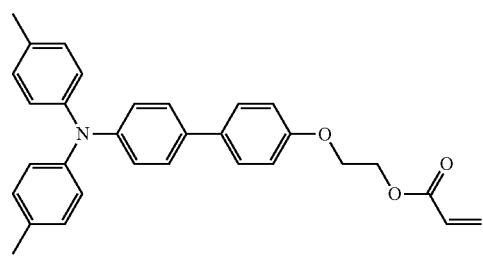

-continued
Example Compound 13
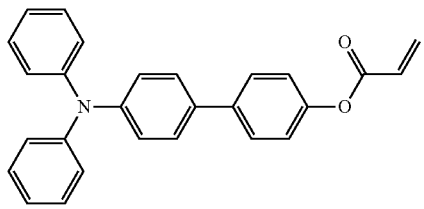
Example Compound 14
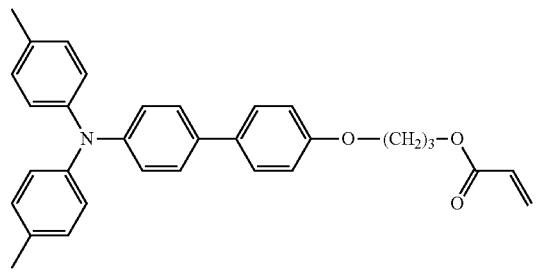
Example Compound 15
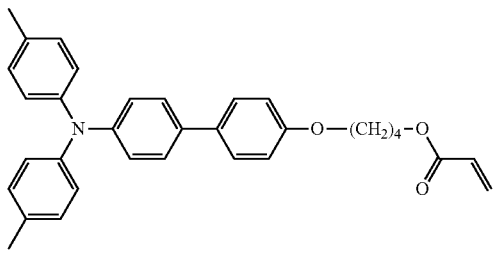
Example Compound 16
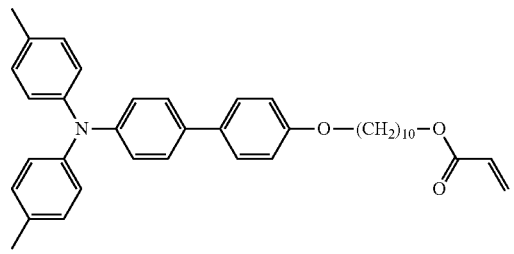
Example Compound 17
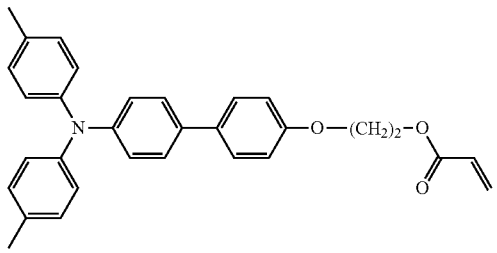
Example Compound 18
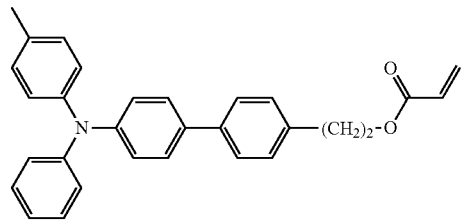
Example Compound 19
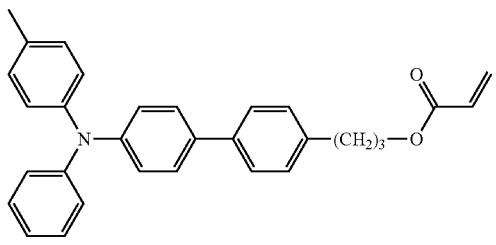
Example Compound 20
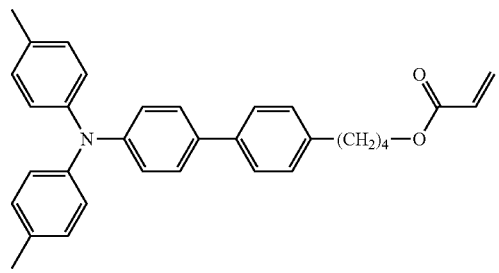
Example Compound 21
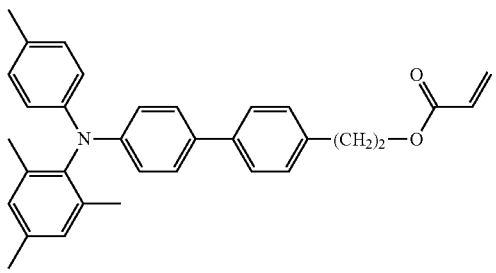
Example Compound 22
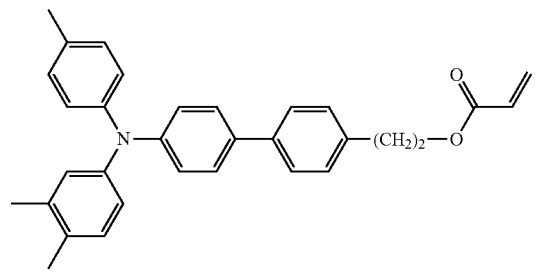

-continued
Example Compound 23
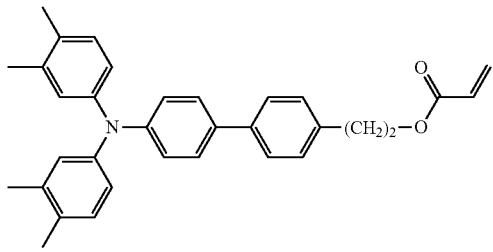
Example Compound 24
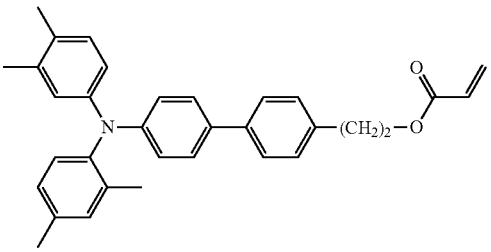
Example Compound 25
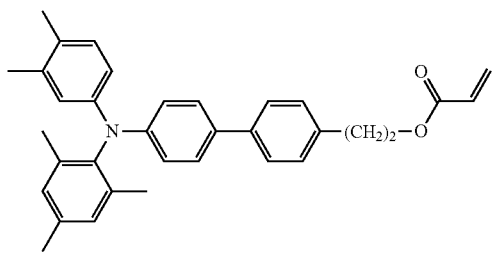
Example Compound 26
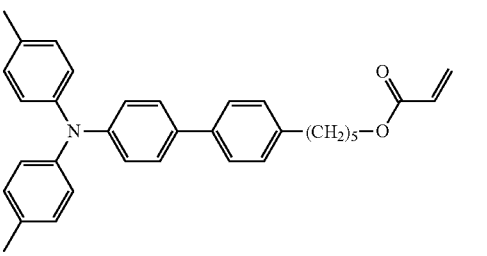
Example Compound 27
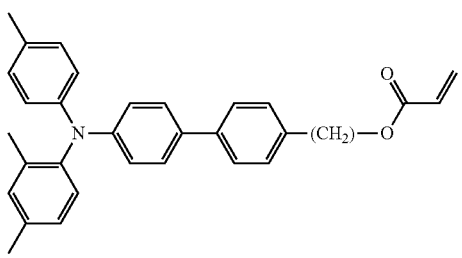
Example Compound 28
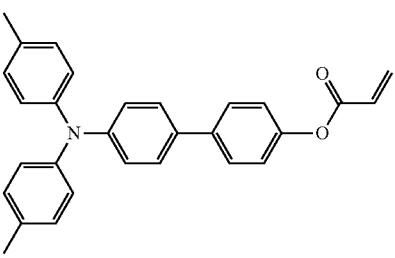
Example Compound 29
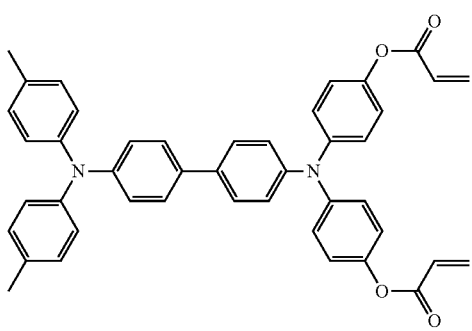
Example Compound 30
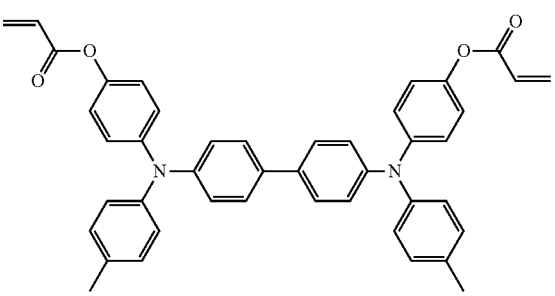
Example Compound 31
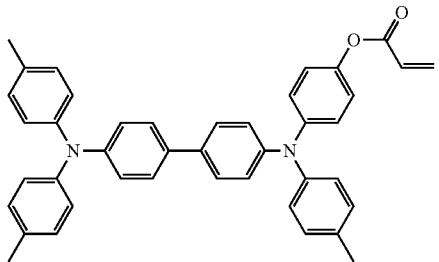
Example Compound 32

-continued
Example Compound 33
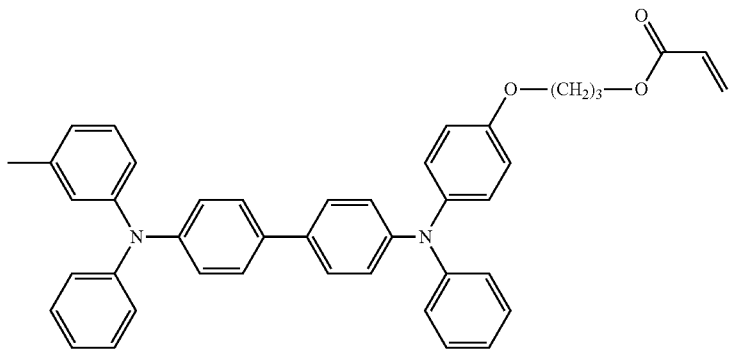
Example Compound 34
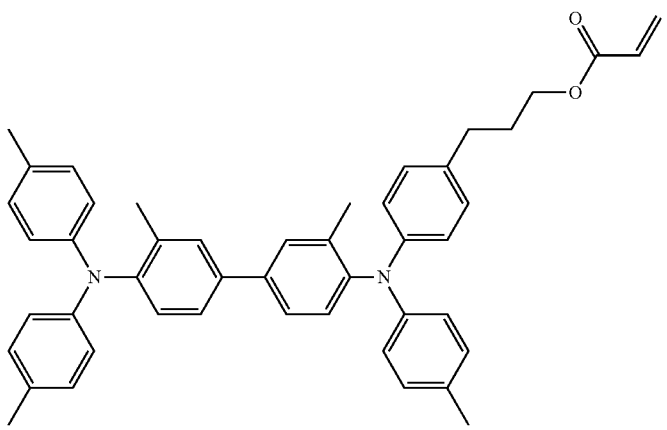
Example Compound 35
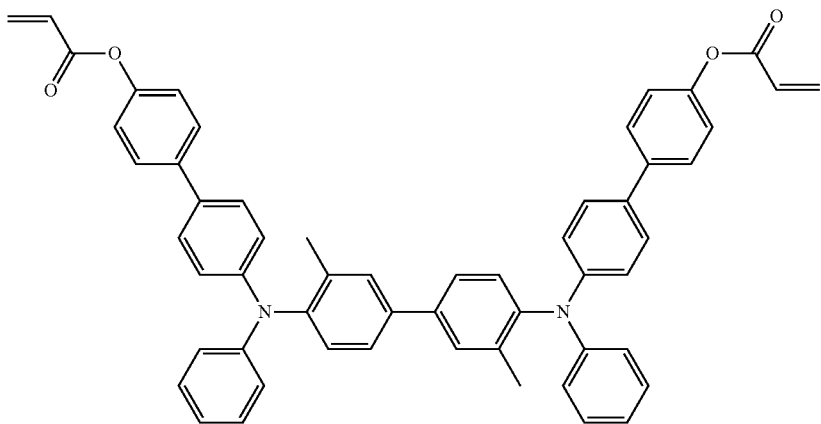
Example Compound 36
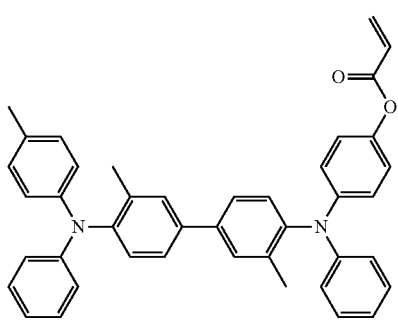
Example Compound 37
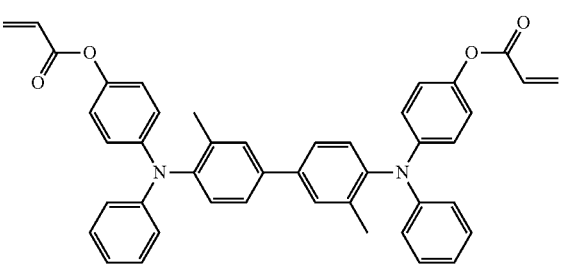

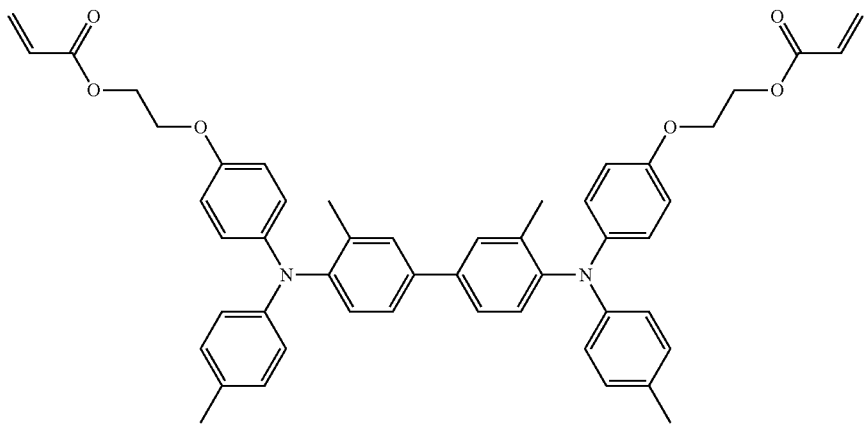

Example Compound 38

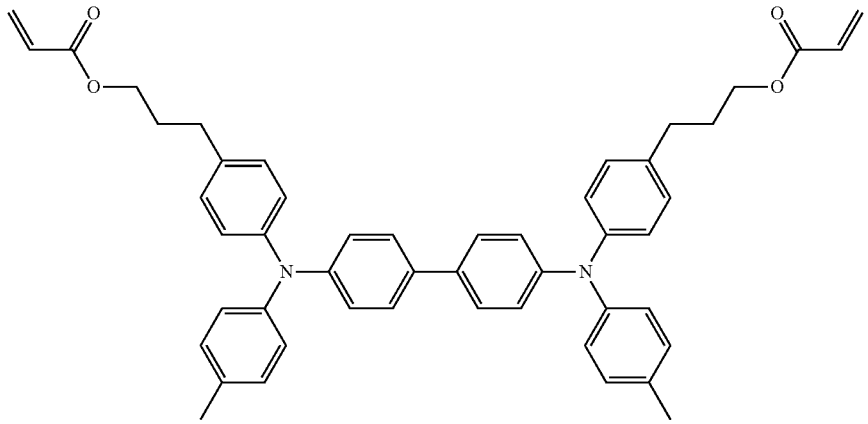

Example Compound 39

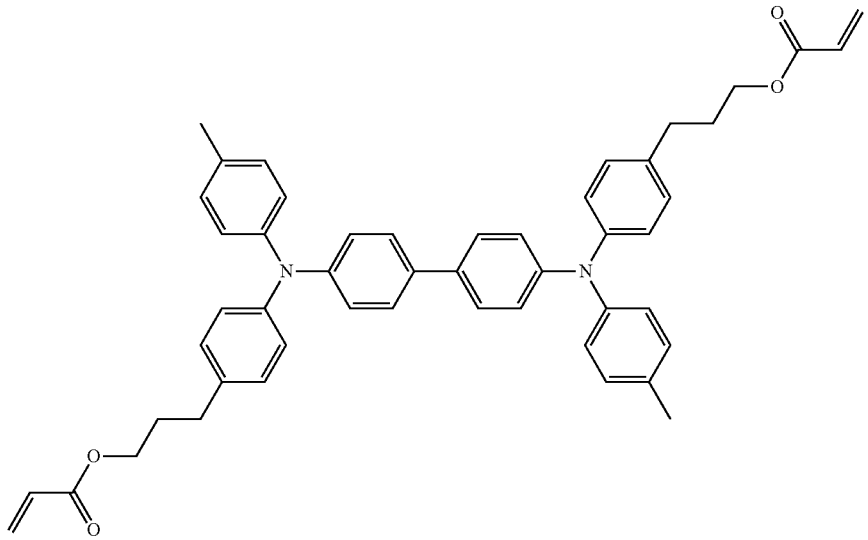

Example Compound 40

Compound having Adsorption Group Adsorptive to First Electrode

The compound having an adsorption group adsorptive to the first electrode is the same as that included in the color developing layer according to the first embodiment.

Preferably, each of the electrochromic compound that develops color by an oxidation reaction and the compound having an adsorption group adsorptive to the first electrode has a polymerizable functional group, and the first electrochromic layer includes a copolymer of the electrochromic compound that develops color by an oxidation reaction and the compound having an adsorption group adsorptive to the first electrode.

Specific examples of the polymerizable functional group include, but are not limited to, acryloyloxy group and methacryloyloxy group.

The radical polymerizable compound other than the triarylamine-containing radical polymerizable compound (hereinafter "the other radical polymerizable compound") has at least one radical polymerizable functional group.

Specific examples of the other radical polymerizable compound include, but are not limited to, monofunctional radical polymerizable compounds, difunctional radical polymerizable compounds, trifunctional and more-functional radical polymerizable compounds, functional monomers, and radical polymerizable oligomers. Among these compounds, difunctional or more-functional radical polymerizable compounds are preferable.

Preferably, the first electrochromic layer includes a cross-linked product of an electrochromic composition including the triarylamine-containing radical polymerizable compound and the other radical polymerizable compound.

Examples of the radical polymerizable functional group included in the other radical polymerizable compound include those exemplified for the radical polymerizable functional group included in the triarylamine-containing radical polymerizable compound. In particular, acryloyloxy group and methacryloyloxy group are preferred as the radical polymerizable functional group.

Specific examples of the monofunctional radical polymerizable compounds include, but are not limited to, 2-(2-ethoxyethoxy)ethyl acrylate, methoxypolyethylene glycol monoacrylate, methoxypolyethylene glycol monomethacrylate, phenoxypolyethylene glycol acrylate, 2-acryloyloxyethyl succinate, 2-ethylhexyl acrylate, 2-hydroxyethyl acrylate, 2-hydroxypropyl acrylate, tetrahydrofurfuryl acrylate, 2-ethylhexylcarbitol acrylate, 3-methoxybutyl acrylate, benzyl acrylate, cyclohexyl acrylate, isoamyl acrylate, isobutyl acrylate, methoxytriethylene glycol acrylate, phenoxytetraethylene glycol acrylate, cetyl acrylate, isostearyl acrylate, stearyl acrylate, and styrene monomer. Each of these compounds can be used alone or in combination with others.

Specific examples of the difunctional radical polymerizable compounds include, but are not limited to, 1,3-butanediol diacrylate, 1,4-butanediol diacrylate, 1,4-butanediol dimethacrylate, 1,6-hexanediol diacrylate, 1,6-hexanediol dimethacrylate, diethylene glycol diacrylate, polyethylene glycol diacrylate, neopentyl glycol diacrylate, EO-modified bisphenol A diacrylate, EO-modified bisphenol F diacrylate, and neopentyl glycol diacrylate. Each of these compounds can be used alone or in combination with others.

Specific examples of the trifunctional radical polymerizable compounds include, but are not limited to, trimethylolpropane triacrylate (TMPTA), trimethylolpropane trimethacrylate, EO-modified trimethylolpropane triacrylate, PO-modified trimethylolpropane triacrylate, caprolactone-modified trimethylolpropane triacrylate, HPA-modified trimethylolpropane trimethacrylate, pentaerythritol triacrylate, pentaerythritol tetraacrylate (PETTA), glycerol triacrylate, ECH-modified glycerol triacrylate, EO-modified glycerol triacrylate, PO-modified glycerol triacrylate, tris(acryloxyethyl) isocyanurate, dipentaerythritol hexaacrylate (DPHA), caprolactone-modified dipentaerythritol hexaacrylate, dipentaerythritol hydroxypentaacrylate, alkyl-modified dipentaerythritol pentaacrylate, alkyl-modified dipentaerythritol tetraacrylate, alkyl-modified dipentaerythritol triacrylate, dimethylolpropane tetraacrylate (DTMPTA), pentaerythritol ethoxytetraacrylate, EO-modified phosphoric triacrylate, and 2,2,5,5-tetrahydroxymethylcyclopentanone tetraacrylate. Each of these compounds can be used alone or in combination with others.

In the above descriptions, "EO-modified" and "PO-modified" represent "ethyleneoxy-modified" and "propyleneoxy-modified", respectively.

Specific examples of the functional monomers include, but are not limited to: fluorine-substituted monomers, such as octafluoropentyl acrylate, 2-perfluorooctylethyl acrylate, 2-perfluorooctylethyl methacrylate, and 2-perfluoroisononylethyl acrylate; polysiloxane-group-containing vinyl monomers having 20 to 70 siloxane repeating units, such as acryloyl polydimethylsiloxane ethyl, methacryloyl polydimethylsiloxane ethyl, acryloyl polydimethylsiloxane propyl, acryloyl polydimethyl siloxane butyl, diacryloyl polydimethylsiloxane diethyl; and acrylates and methacrylates. Each of these compounds can be used alone or in combination with others.

Specific examples of the radical polymerizable oligomers include, but are not limited to, epoxy acrylate oligomers, urethane acrylate oligomers, and polyester acrylate oligomers.

Preferably, at least one of the triarylamine-containing radical polymerizable compound and the other radical polymerizable compound has two or more radical polymerizable functional groups in view of an effective formation of a cross-lined product.

Preferably, the content rate of the triarylamine-containing radical polymerizable compound in the electrochromic composition is in the range of from 10% to 100% by mass, more preferably from 30% to 90% by mass.

When the content rate is 10% by mass or more, the first electrochromic layer can express a sufficient electrochromic function, high durability against repeated use under application of voltage, and high color developing sensitivity.

Even when the content rate is 100% by mass, the first electrochromic layer can express an electrochromic function. In this case, the color developing sensitivity of the first electrochromic layer is high with respect to the thickness thereof. At the same time, by contrast, there may be a case in which the first electrochromic layer becomes less compatible with an ionic liquid that is needed for giving and receiving charge, thereby causing deterioration of durability against repeated use under application of voltage and deterioration of electric properties. Although it depends on the process with which the electrochromic element is to be used, a preferred content rate is in the range of from 30% to 90% by mass in view of an achievement of a balance between color developing sensitivity and durability against repeated use.

Preferably, the electrochromic composition further contains a polymerization initiator for the purpose of improving a cross-linking reaction efficiency between the triarylamine-containing radical polymerizable compound and the other radical polymerizable compound.

Examples of the polymerization initiator include, but are not limited to, thermal polymerization initiators and photopolymerization initiators. From the aspect of polymerization efficiency, photopolymerization initiators are preferable.

Specific examples of the thermal polymerization initiators include, but are not limited to, peroxide initiators (e.g., 2,5-dimethylhexane-2,5-dihydroperoxide, dicumyl peroxide, benzoyl peroxide, t-butylcumyl peroxide, 2,5-dimethyl-2,5-di(peroxybenzoyl)hexine-3, di-t-butyl peroxide, t-butyl hydroperoxide, cumene hydroperoxide, lauroyl peroxide) and azo initiators (e.g., azobisisobutyronitrile, azobiscyclohexanecarbonitrile, azobis(methyl isobutyrate), azobisisobutyl amidine hydrochloride, 4,4'-azobis-4-cyanovaleric acid). Each of these compounds can be used alone or in combination with others.

Specific examples of the photopolymerization initiators include, but are not limited to, acetophenone or ketal photopolymerization initiators (e.g., diethoxyacetophenone, 2,2-dimethoxy-1,2-diphenylethane-1-one, 1-hydroxy-cyclohexyl-phenyl-ketone, 4-(2-hydroxyethoxy)phenyl-(2-hydroxy-2-propyl) ketone, 2-benzyl-2-dimethylamino-1-(4-morpholinophenyl)butanone-1,2-hydroxy-2-methyl-1-phenylpropane-1-one, 2-methyl-2-morpholino(4-methylthiophenyl)propane-1-one, 1-phenyl-1,2-propanedione-2-(o-ethoxycarbonyl)oxime), benzoin ether photopolymerization initiators (e.g., benzoin, benzoin methyl ether, benzoin ethyl ether, benzoin isobutyl ether, benzoin isopropyl ether), benzophenone photopolymerization initiators (e.g., benzophenone, 4-hydroxybenzophenone, methyl o-benzoylbenzoate, 2-benzoyl naphthalene, 4-benzoyl biphenyl, 4-benzoyl phenyl ether, acrylated benzophenone, 1,4-benzoyl benzene), and thioxanthone photopolymerization initiators (e.g., 2-isopropyl thioxanthone, 2-chlorothioxanthone, 2,4-dimethylthioxanthone, 2,4-diethylthioxanthone, 2,4-dichlorothioxanthone).

Specific examples of the photopolymerization initiators further include, but are not limited to, ethylanthraquinone, 2,4,6-trimethylbenzoyldiphenylphosphine oxide, 2,4,6-trimethylbenzoylphenylethoxyphosphine oxide, bis(2,4,6-trimethylbenzoyl)phenylphosphine oxide, bis(2,4-dimethoxybenzoyl)-2,4,4-trimethylpentylphosphine oxide, methylphenylglyoxy ester, 9,10-phenanthrene, acridine compounds, triazine compounds, and imidazole compounds. Each of these compounds can be used alone or in combination with others.

In addition, a photopolymerization accelerator may be used alone or in combination with the photopolymerization initiator. Specific examples of the photopolymerization accelerator include, but are not limited to, triethanolamine, methyldimethanolamine, ethyl 4-dimethylaminobenzoate, isoamyl 4-dimethylaminobenzoate, (2-dimethylamino)ethyl benzoate, and 4,4'-dimethylaminobenzophenone.

Preferably, the content of the polymerization initiator is in the range of from 0.5 to 40 parts by mass, more preferably from 1 to 20 parts by mass, based on 100 parts by mass of the total radical polymerizable compounds.

Examples of the other components include, but are not limited to, a solvent, a plasticizer, a leveling agent, a sensitizer, a dispersant, a surfactant, an antioxidant, and a filler.

The first electrochromic layer can be formed by vacuum vapor deposition, sputtering, or ion plating.

The first electrochromic layer can also be formed by any coating method such as spin coating, casting, micro gravure coating, gravure coating, bar coating, roll coating, wire bar coating, dip coating, slit coating, capillary coating, spray coating, nozzle coating, and various printing methods such as gravure printing, screen printing, flexo printing, offset printing, reverse printing, and inkjet printing.

Preferably, the first electrochromic layer has an average thickness of from 0.1 to 30 μm, and more preferably from 0.4 to 10 μm.

Electrolyte Layer

The electrolyte layer is an ion-conducting layer for supplying ion to the first electrochromic layer. Preferably, the electrolyte layer is transparent, since the electrochromic element is used as a display element.

The electrolyte layer includes an electrolyte and an electrolyte solvent, and optionally includes other components, if needed.

The electrolyte and the electrolyte solvent are the same as those included in the color developing layer according to the first embodiment.

The electrolyte need not necessarily be a low-viscosity liquid and may be in the form of a gel, cross-linked polymer, or liquid crystal dispersion. Electrolytes in the form of a gel or solid are advantageous in terms of strength and reliability of the element.

Preferably, the electrolyte and the solvent are held in a polymer resin for reliable fixation. Such an electrolyte layer provides high ion conductivity and solid strength.

It is preferable that the polymer resin is a photo-curable resin. When the polymer resin is a photo-curable resin, the electrochromic element can be produced at a lower temperature within a shorter time period, compared to a case in which the polymer resin is thinned through a thermal polymerization and/or solvent evaporation.

Preferably, the electrolyte layer has an average thickness of from 100 nm to 10 am.

Color Developing Layer According to Third Embodiment

The color developing layer according to the third embodiment includes a first electrochromic layer in contact with the first electrode, an electrolyte layer, and a second electrochromic layer in contact with the second electrode. The color developing layer according to the third embodiment is different from that according to the second embodiment in that the second electrochromic layer is further added to the color developing layer for the purpose of improving responsiveness and contrast and controlling color.

First Electrochromic Layer in Contact with First Electrode

The first electrochromic layer according to the third embodiment is the same as the first electrochromic layer according to the second embodiment.

Second Electrochromic Layer in Contact with Second Electrode

Preferably, the second electrochromic layer includes an electrochromic compound that develops color by a reduction reaction.

Preferably, the electrochromic compound that develops color by a reduction reaction is a viologen compound or a dipyridine compound.

Specific examples of the viologen compound and the dipyridine compound include those exemplified above for the color developing layer according to the first embodiment.

The second electrochromic layer may be formed of conductive or semiconductive particles carrying an organic electrochromic compound thereon. More specifically, the second electrochromic layer may be formed of fine particles having a particle diameter of about 5 to 50 nm adsorbing an organic electrochromic compound having a polar group (e.g., phosphonate group, carboxyl group, silanol group) on their surfaces, sintered on a surface of an electrode.

With this configuration, electrons can be effectively injected into the organic electrochromic compound owing to a large surface effect of the fine particles. An electrochromic element with this configuration can respond more rapidly compared to a conventional electrochromic element. In addition, since the fine particles can be formed into a transparent display layer, the electrochromic dye can develop color at a much higher density. Furthermore, the conductive or semiconductive particles can carry multiple types of organic electrochromic compounds.

Specific preferred materials for the conductive or semiconductive particles include metal oxides, but are not limited thereto. Specific examples of the metal oxides include, but are not limited to, titanium oxide, zinc oxide, tin oxide, zirconium oxide, cerium oxide, yttrium oxide, boron oxide, magnesium oxide, strontium titanate, potassium titanate, barium titanate, calcium titanate, calcium oxide, ferrite, hafnium oxide, tungsten oxide, iron oxide, copper oxide, nickel oxide, cobalt oxide, barium oxide, strontium oxide, vanadium oxide, aluminosilicate, and calcium phosphate. Each of these compounds can be used alone or in combination with others.

From the aspect of electric property (e.g., electric conductivity) and physical property (e.g., optical property), titanium oxide, zinc oxide, tin oxide, zirconium oxide, iron oxide, magnesium oxide, indium oxide, and tungsten oxide are preferred.

The conductive or semiconductive particles are not limited in shape. Preferably, the conductive or semiconductive particles have a shape that has a large surface area per unit volume (hereinafter "specific surface area") for effectively carrying the electrochromic compound. For example, in a case in which the particles are composed of an aggregate of nano particles, the particles can effectively carry the electrochromic compound owing to their large specific surface area, thus providing an excellent display contrast ratio between color development and discharge.

The second electrochromic layer can be formed by vacuum vapor deposition, sputtering, or ion plating. The second electrochromic layer can also be formed by any coating method such as spin coating, casting, micro gravure coating, gravure coating, bar coating, roll coating, wire bar coating, dip coating, slit coating, capillary coating, spray coating, nozzle coating, and various printing methods such as gravure printing, screen printing, flexo printing, offset printing, reverse printing, and inkjet printing.

Preferably, the second electrochromic layer has an average thickness of from 0.2 to 5.0 µm. When the average thickness is from 0.2 to 5.0 µm, color developing density is high, the manufacturing cost is fair, and visibility is enhanced.

The second electrochromic layer that may be formed of conductive or semiconductive particles can be formed by means of vacuum film formation or coating of a particle-dispersed paste. The coating is more preferable in terms of productivity.

Electrolyte Layer

The electrolyte layer includes an electrolyte and an electrolyte solvent, and optionally includes other components, if needed.

The electrolyte layer is the same as that according to the second embodiment.

Preferably, the electrolyte layer has an average thickness of from 100 nm to 10 µm.

First Electrode

Preferably, the first electrode is formed of a transparent conductive material. Examples of the transparent conductive material include inorganic materials such as tin-doped indium oxide (i.e., indium tin oxide (ITO)), fluorine-doped tin oxide (FTO), antimony-doped tin oxide (ATO), and zinc oxide. Alternatively, a conductivity-improved transparent electrode, formed of a fine network of transparent carbon nanotube and other highly-conductive non-transmissive materials such as Au, Ag, Pt, and Cu, may be used. In particular, ITO is preferably used as the electrode since it provides a high adhesion force.

The first electrode can be formed by vacuum vapor deposition, sputtering, or ion plating. The first electrode can also be formed by any coating method such as spin coating, casting, micro gravure coating, gravure coating, bar coating, roll coating, wire bar coating, dip coating, slit coating, capillary coating, spray coating, nozzle coating, and various printing methods such as gravure printing, screen printing, flexo printing, offset printing, reverse printing, and inkjet printing.

Second Electrode

The second electrode is disposed facing the first electrode. The second electrode may be either transparent (like the first electrode) or non-transparent. When the second electrode is transparent, the second electrode may be formed of an inorganic material such as tin-doped indium oxide (i.e., indium tin oxide (ITO)), fluorine-doped tin oxide (FTO), antimony-doped tin oxide (ATO), and zinc oxide. Alternatively, a conductivity-improved transparent electrode, formed of a fine network of transparent carbon nanotube and other highly-conductive non-transmissive materials such as Au, Ag, Pt, and Cu, may be used. Additionally, the second electrode may be formed into a porous electrode by forming a titanium oxide particle film or a tin oxide particle film thereon.

When the second electrode is non-transparent, the second electrode may be formed of a plate of a metal such as Cu, Al, Ti, and Zn.

The second electrode can be formed by vacuum vapor deposition, sputtering, or ion plating.

The second electrode can also be formed by any coating method such as spin coating, casting, micro gravure coating, gravure coating, bar coating, roll coating, wire bar coating, dip coating, slit coating, capillary coating, spray coating, nozzle coating, and various printing methods such as gravure printing, screen printing, flexo printing, offset printing, reverse printing, and inkjet printing.

Other Members

The electrochromic element may further include other members, such as a first substrate, a second substrate, an insulating porous layer, a protective layer, and a white reflective layer.

First Substrate and Second Substrate

The first substrate and the second substrate may be made of organic and/or inorganic transparent materials capable of supporting other layers.

For example, glass substrates made of non-alkali-glass, borosilicate glass, float glass, or soda-lime glass may be used as the first and second substrates.

In addition, resin substrates made of polycarbonate resin, acrylic resin, polyethylene, polyvinyl chloride, polyester, epoxy resin, melamine resin, phenol resin, polyurethane resin, and polyimide resin, may be used as the first and second substrates.

Among these materials, polycarbonate resin is preferable from the aspect of processability and transparency.

The substrate may have a surface coating such as a transparent insulating layer, a UV cut layer, and/or an antireflection layer, for improving vapor barrier property, gas barrier property, ultraviolet resistance, and visibility.

The first and second substrates are not limited in shape, and may have a rectangular shape or a circular shape.

The first and second substrates may be a laminated body of multiple materials. As an example, an electrochromic element that is sandwiched by two glass substrates provides improved vapor barrier property and gas barrier property.

Insulating Porous Layer

The insulating porous layer has a function of electrically insulating the first electrode and the second electrode from each other and another function of holding the electrolyte.

The insulating porous layer is made of a transparent porous material. In particular, organic, inorganic, or organic-inorganic composite materials having high insulation property, durability, and film-formation property are preferably used.

The insulating porous layer can be formed by: a sintering method in which polymer fine particles or inorganic particles are partially fused with each other via a binder to form pores between the particles; or an extraction method in which solvent-soluble organic or inorganic substances and solvent-insoluble binders are formed into a layered structure, and the organic or inorganic substances are dissolved with a solvent to form pores.

The insulating porous layer can also be formed by: a foaming method in which a high-molecular-weight polymer is foamed by means of heating or degassing; a phase inversion method in which a mixture of polymers is subjected to phase separation by handling a good solvent and a poor solvent; or a radiation irradiation method in which pores are formed by means of radiation. The porous insulating layer may be made of, for example, a polymer-mixed particle film containing fine metal oxide particles (e.g., $SiO_2$ particles, $Al_2O_3$ particles) and a polymer binder, a porous organic film (e.g., polyurethane resin film, polyethylene resin film), or a porous inorganic insulating material film. In particular, $SiO_2$ particles are preferably used, since they have high insulating property relatively low refractive index and are inexpensive.

The insulating porous layer can be formed by vacuum vapor deposition, sputtering, or ion plating. The insulating porous layer can also be formed by any coating method such as spin coating, casting, micro gravure coating, gravure coating, bar coating, roll coating, wire bar coating, dip coating, slit coating, capillary coating, spray coating, nozzle coating, and various printing methods such as gravure printing, screen printing, flexo printing, offset printing, reverse printing, and inkjet printing.

Preferably, the insulating porous layer has an average thickness of from 0.5 to 3 μm.

Protective Layer

The protective layer has functions of protecting the electrochromic element from external stress and chemicals used in the washing process, preventing the electrolyte from leaking from the electrochromic element, and preventing the electrochromic element from being intruded by unnecessary substances, such as moisture and oxygen in the air, for its stable operation.

Preferably, the protective layer has an average thickness of from 1 to 200 μm.

The protective layer may include an ultraviolet-curable or heat-curable resin such as acrylic resin, urethane resin, and epoxy resin.

The electrochromic elements according to some embodiments of the present invention can be used for, for example, large-size displays such as electrochromic display and stock price display, light control elements such as anti-glare mirror and light control glass, low-voltage driving elements such as touch-panel-type key switch, optical switch, optical memory, electronic paper, and electronic album.

FIG. 1 is a cross-sectional view of an electrochromic element according to the first embodiment, including a first electrode 1, a second electrode 4, and a single color developing layer 5. The color developing layer 5 includes an electrochromic compound, a compound having an adsorption group adsorptive to the first electrode 1, an electrolyte, an electrolyte solvent, and a binder.

Figure 2:
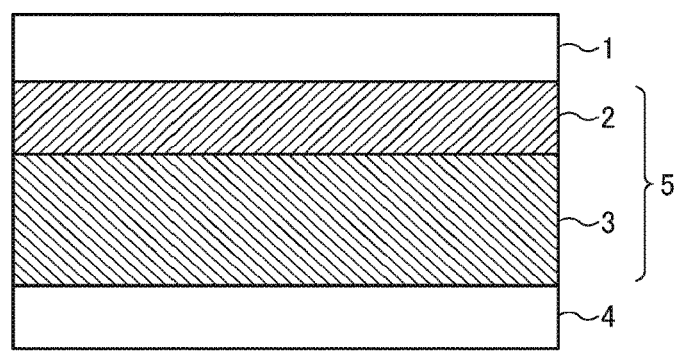
FIG. 2 is a schematic cross-sectional view of an electrochromic element according to an embodiment of the present invention.

FIG. 2 is a cross-sectional view of an electrochromic element according to the second embodiment, including the first electrode 1, an electrochromic layer 2, an electrolyte layer 3 in contact with the electrochromic layer 2, and the second electrode 4 disposed facing the first electrode 1. The electrochromic layer 2 changes its color and transmittance by an electrochemical redox reaction. In this embodiment, the electrochromic layer 2 and the electrolyte layer 3 form the color developing layer 5.

Figure 3:
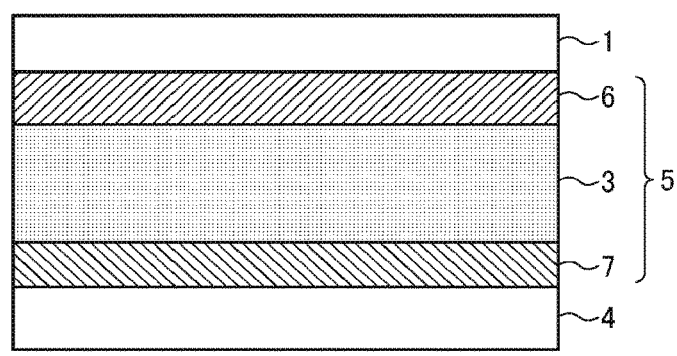
FIG. 3 is a schematic cross-sectional view of an electrochromic element according to an embodiment of the present invention.

FIG. 3 is a cross-sectional view of an electrochromic element according to the third embodiment, including the first electrode 1, a first electrochromic layer 6, the electrolyte layer 3, a second electrochromic layer 7, and the second electrode 4. The second electrochromic layer 7 is formed on the second electrode 4 for the purpose of improving responsiveness and the density of developed color. In this embodiment, the first electrochromic layer 6 and the second electrochromic layer 7 are required to develop or discharge color at the same time. More specifically, when the first electrochromic layer 6 develops color by an oxidation reaction, the second electrochromic layer 7 develops color by a reduction reaction. When the first electrochromic layer 6 develops color by a reduction reaction, the second electrochromic layer 7 develops color by an oxidation reaction. In this embodiment, the first electrochromic layer 6, the electrolyte layer 3, and the second electrochromic layer 7 form the color developing layer 5.

EXAMPLES

Further understanding of the present disclosure can be obtained by reference to certain specific examples provided herein below for the purpose of illustration only and are not intended to be limiting.

Example 1

Formation of Electrochromic Layer on First Electrode

Preparation of Electrochromic Composition

To form an electrochromic layer including a compound having an adsorption group adsorptive to the first electrode on the first electrode, an electrochromic composition containing the materials listed below was prepared.

Composition

Electrochromic compound including difunctional acrylate represented by the following formula (Example Compound 40): 100 parts by mass

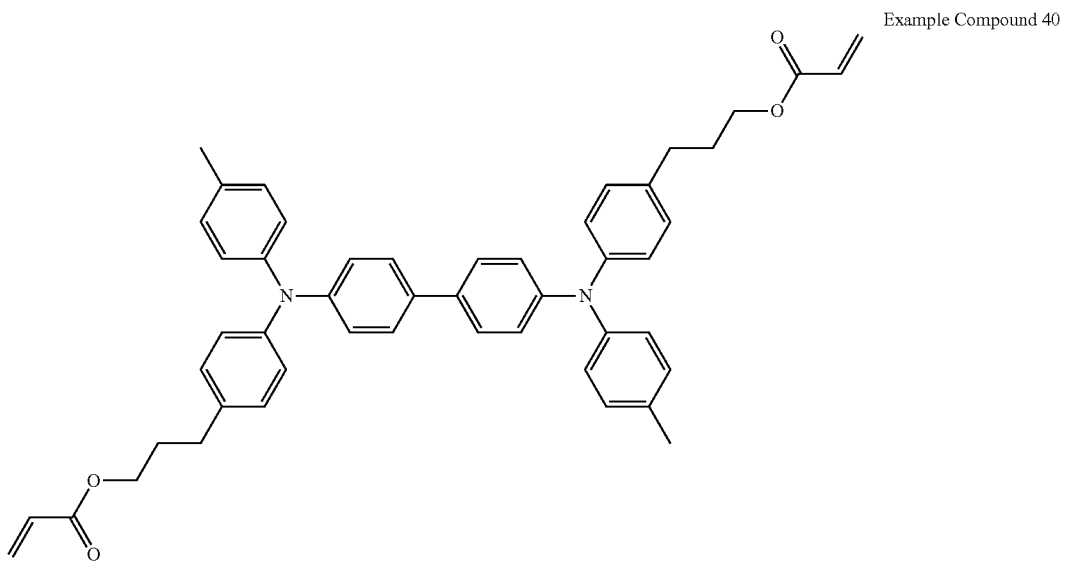 [SMILES: C=CC(=O)OCCCc1ccc(N(c2ccc(C)cc2)c2ccc(-c3ccc(N(c4ccc(C)cc4)c4ccc(CCCOC(=O)C=C)cc4)cc3)cc2)cc1]

Example Compound 40

Binder (PME 400 available from NOF CORPORATION): 90.25 parts by mass

Compound having an adsorption group adsorptive to the first electrode, represented by the following formula A (KAYAMER PM-21 available from Nippon Kayaku Co., Ltd.): 4.75 parts by mass Formula A

$a \approx 1.5, b \approx 1.5$

Photopolymerization initiator (IRGACURE 184 available from BASF Japan Ltd.): 5 parts by mass Solvent (Tetrahydrofuran): 800 parts by mass Formation of Electrochromic Layer on First Electrode The electrochromic composition was applied onto an ITO glass substrate (having an area of 40 mm×40 mm, a thickness of 0.7 mm, and an ITO film thickness of about 100 nm), serving as the first substrate and the first electrode, by spin coating.

The resulting coating layer was exposed to ultraviolet ray emitted from an UV emitter (SPOT CURE available from Ushio Inc.) at 1.2 mW/cm² for 240 seconds, and then subjected to an annealing treatment at 60° C. for 1 minute. Thus, a cross-linked electrochromic layer having an average thickness of 1.3 μm was formed.

Evaluation of Adhesion: Cross-Cut Adhesion Test

The electrochromic layer formed on the first electrode (ITO) was subjected to the cross-cut test according to JIS K5600-5-6 (ISO 2409). The cross-cut test is a simple test widely used in industrial fields for evaluating adhesion.

In the test, lattice-shaped cuts, formed of 1-mm-spaced six parallel cuts, were made on the electrochromic layer. The cuts had a depth enough for reaching the substrate (first electrode). A piece of scotch tape having a width of 24 mm was adhered onto the electrochromic layer having the cuts, and thereafter peeled off over a period of about 1 second while keeping an angle of about 60 degrees with the substrate (first electrode). The adhesion between the electrochromic layer and the first electrode (ITO) was evaluated based on the degree of detachment of the electrochromic layer from the substrate (first electrode).

The degree of detachment was determined referring to the 6-grade classification defined in Table 1 and the appearance thereof illustrated in FIG. 4. The results are presented in Table 2.

TABLE 1

| Classification | Description |
|---|---|
| 0 | The edges of the cuts are completely smooth; none of the squares of the lattice is detached. |
| 1 | Detachment of small flakes of the coating at the intersections of the cuts. A cross-cut area not greater than 5% is affected. |
| 2 | The coating has flaked along the edges and/or at the intersections of the cuts. A cross-cut area greater than 5%, but not greater than 15%, is affected. |
| 3 | The coating has flaked along the edges of the cuts partly or wholly in large ribbons, and/or it has flaked partly or wholly on different parts of the squares. A cross-cut area greater than 15%, but not greater than 35%, is affected. |
| 4 | The coating has flaked along the edges of the cuts in large ribbons and/or some squares have detached partly or wholly. A cross-cut area greater than 35%, but not greater than 65%, is affected. |
| 5 | Any degree of flaking that cannot even be classified by classification 4. |

Example 2

The procedure in Example 1 was repeated except for changing the content of PME400 in the electrochromic composition from 90.25 parts by mass to 92.15 parts by mass, and changing the content of the compound having an adsorption group adsorptive to the first electrode represented by the following formula A (KAYAMER PM-21 available from Nippon Kayaku Co., Ltd.) from 4.75 parts by mass to 2.85 parts by mass. The cross-cut adhesion test was performed in the same manner as in Example 1. The results are presented in Table 2.

Example 3

The procedure in Example 1 was repeated except for replacing the compound having an adsorption group adsorptive to the first electrode represented by the following formula A (KAYAMER PM-21 available from Nippon Kayaku Co., Ltd.) with another compound having an adsorption group adsorptive to the first electrode represented by the following formula B (KAYAMER PM-2 available from Nippon Kayaku Co., Ltd.). The cross-cut adhesion test was performed in the same manner as in Example 1. The results are presented in Table 2.

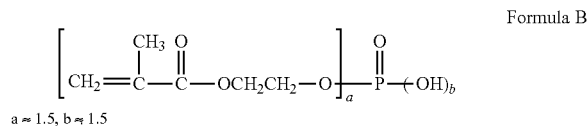

Formula B $a \approx 1.5, b \approx 1.5$

Example 4

The procedure in Example 3 was repeated except for changing the content of PME400 in the electrochromic composition from 90.25 parts by mass to 92.15 parts by mass, and changing the content of the compound having an adsorption group adsorptive to the first electrode represented by the following formula B (KAYAMER PM-2 available from Nippon Kayaku Co., Ltd.) from 4.75 parts by mass to 2.85 parts by mass. The cross-cut adhesion test was performed in the same manner as in Example 1. The results are presented in Table 2.

Comparative Example 1

The procedure in Example 1 was repeated except for changing the content of PME400 in the electrochromic composition from 90.25 parts by mass to 95.00 parts by mass, and excluding the compound having an adsorption group adsorptive to the first electrode represented by the following formula A (KAYAMER PM-21 available from Nippon Kayaku Co., Ltd.). The cross-cut adhesion test was performed in the same manner as in Example 1. The results are presented in Table 2.

TABLE 2

| Composition (parts by mass) | Example 1 | Example 2 | Example 3 | Example 4 | Comparative Example 1 |
|---|---|---|---|---|---|
| Example Compound 40 | 100 | 100 | 100 | 100 | 100 |
| PME400 | 90.25 | 92.15 | 90.25 | 92.15 | 95.00 |
| PM-21 | 4.75 | 2.85 | — | — | — |
| PM-2 | — | — | 4.75 | 2.85 | — |
| IRGACURE 184 | 5 | 5 | 5 | 5 | 5 |
| Tetrahydrofuran | 800 | 800 | 800 | 800 | 800 |
| Cross-cut Adhesion Test | 0 | 1 | 3 | 4 | 5 |

It is clear from the results presented in Table 2 that the adhesion between the first electrode and the electrochromic layer is improved when the compound having an adsorption group adsorptive to the first electrode is included in the electrochromic layer.

Example 5

Formation of Color Developing Layer on First Electrode
Preparation of Color Developing Layer Composition To form a color developing layer including a compound having an adsorption group adsorptive to the first electrode on the first electrode, a color developing layer composition containing the materials listed below was prepared.

Composition
  Ethyl viologen (1,1'-Diethyl-4,4'-bipyridinium): 1 part by mass
  PEG400DA (available from Nippon Kayaku Co., Ltd.): 45 parts by mass
  Compound having an adsorption group adsorptive to the first electrode, represented by the formula A (KAYAMER PM-21 available from Nippon Kayaku Co., Ltd.): 5 parts by mass
  IRGACURE 184 (available from BASF Japan Ltd.): 5 parts by mass
  1-Ethyl-3-methylimidazoliumbis(fluorosulfonyl)imide (EMIMFSI) (available from Kanto Chemical Co., Inc.): 10 parts by mass
  Propylene carbonate (available from Tokyo Chemical Industry Co., Ltd.): 34 parts by mass Formation of Color Developing Layer on First Electrode The color developing layer composition was applied onto an ITO glass substrate (having an area of 40 mm×40 mm, a thickness of 0.7 mm, and an ITO film thickness of about 100 nm), serving as the first substrate and the first electrode, by screen printing.

The resulting coating layer was exposed to ultraviolet ray emitted from an UV emitter (SPOT CURE available from Ushio Inc.) at 1.2 mW/cm$^2$ for 240 seconds, and then subjected to an annealing treatment at 60° C. for 1 minute. Thus, a cross-linked color developing layer having an average thickness of 30 μm was formed.

Evaluation of Adhesion: Cross-Cut Adhesion Test

The cross-cut adhesion test was performed in the same manner as in Example 1. The results are presented in Table 3.

Comparative Example 2

The procedure in Example 5 was repeated except for changing the content of PEG400DA in the color developing layer composition from 45 parts by mass to 50 parts by mass, and excluding the compound having an adsorption group adsorptive to the first electrode represented by the following formula A (KAYAMER PM-21 available from Nippon Kayaku Co., Ltd.). The cross-cut adhesion test was performed in the same manner as in Example 1. The results are presented in Table 3.

TABLE 3

| Composition (parts by mass) | Example 5 | Comparative Example 2 |
|---|---|---|
| Ethyl Viologen | 1 | 1 |
| PEG400DA | 45 | 50 |
| PM-21 | 5 | — |
| EMIMFSI | 10 | 10 |
| IRGACURE 184 | 5 | 5 |
| Propylene Carbonate | 34 | 34 |
| Cross-cut Adhesion Test | 1 | 5 |

It is clear from the results presented in Table 3 that the adhesion between the first electrode and the electrochromic layer is improved when the compound having an adsorption group adsorptive to the first electrode is included in the color developing layer.

Example 6

Preparation of Electrochromic Element
An electrochromic element was prepared as follows.
Formation of First Electrochromic Layer on First Electrode
The cross-linked electrochromic layer having an average thickness of 1.3 μm prepared in Example 1 was used as a first electrochromic layer formed on the first electrode.
Formation of Second Electrochromic Layer on Second Electrode
A titanium oxide nano particle dispersion liquid (SP210 available from Showa Titanium Co., Ltd., having an average particle diameter of about 20 nm) was applied onto an ITO glass substrate (having an area of 40 mm×40 mm, a thickness of 0.7 mm, and an ITO film thickness of about 100 nm), serving as the second substrate and the second electrode, by spin coating, and subjected to an annealing treatment at 120° C. for 15 minutes. Thus, a titanium oxide particle film was formed.
Further, a 2% (by mass) 2,2,3,3-tetrafluoropropanol solution of a compound having the following formula (iii) was applied onto the titanium oxide particle film by spin coating, and subjected to an annealing treatment at 120° C. for 10 minutes, to allow the titanium oxide particle on the second electrode to adsorb the compound having the formula (iii) on the surface thereof. Thus, a second electrochromic layer having an average thickness of 1.0 μm was formed.

Preparation of Blank Cell
The first electrode and the second electrode were laminated such that the first electrochromic layer and the second electrochromic layer face each other with a film having an average thickness of 50 μm sandwiched therebetween. The first electrode and the second electrode were then bonded together through two sides thereof with a UV delay-curing adhesive (PHOTOLEC E, low WVTR (Water Vapor Transmission Rate) type, available from Sekisui Chemical Co., Ltd.), and the film was drawn out thereafter. Thus, a blank cell was prepared.
Electrolyte Filling
An electrolyte composition having the following composition was prepared.
PEG400DA (available from Nippon Kayaku Co., Ltd.): 50 parts by mass
IRGACURE 184 (available from BASF Japan Ltd.): 2 parts by mass
1-Ethyl-3-methylimidazoliumbis(fluorosulfonyl)imide (available from Kanto Chemical Co., Inc.): 50 parts by mass The blank cell was carefully filled with the electrolyte composition without generating undesirable bubbles therein. The blank cell was thereafter exposed to ultraviolet light (having a wavelength of 250 nm) emitted from an UV emitter (SPOT CURE available from Ushio Inc.) at 10 mW/cm$^2$ for 60 seconds so that the electrolyte got cured. The other two sides of the first electrode and the second electrodes were bonded together. Thus, an electrochromic element was prepared.
Color Development-Discharge Operation Test
After being left for 24 hours under a temperature of 60° C., the electrochromic element was applied with a voltage of 1.6 V for 5 seconds to develop color. The electrochromic element was thereafter applied with a voltage of −0.6 V for 5 seconds to discharge color. During the color change, light transmittance of the electrochromic element within a wavelength range of from 380 to 780 nm was measured by an optical property evaluation system (LCD-5200 available from Otsuka Electronics Co., Ltd.). The color development-discharge operation was evaluated according to the following criteria based on the average of the measured transmittance values.
Evaluation Criteria
Good: The average transmittance in a color development state was 70% or more, and the average transmittance in a color discharge state was 20% or less. The color development-discharge operation was normally performed. (Acceptable)
Poor: The average transmittance in a color development state was not 70% or more and/or the average transmittance in a color discharge state was not 20% or less. (Unacceptable)

Examples 7-9 and Comparative Example 3

The procedure in Example 6 was repeated except for replacing the first electrode having the first electrochromic layer according to Example 1 with that according to another Example as specified in Table 4, thus preparing electrochromic elements according to Examples 7-9 and Comparative Example 3. The color development-discharge operation test was performed in the same manner as in Example 6. The results are presented in Table 4.

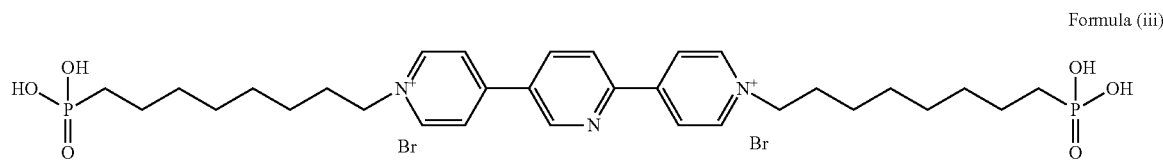 [SMILES: O=P(O)(O)CCCCCCCC[n+]1ccc(-c2ccc(-c3cc[n+](CCCCCCCCP(=O)(O)O)cc3)nc2)cc1 ; Br ; Br]

Formula (iii)

TABLE 4

|  | Example 6 | Example 7 | Example 8 | Example 9 | Comparative Example 3 |
|---|---|---|---|---|---|
| First Electrochromic layer + First Electrode | Example 1 | Example 2 | Example 3 | Example 4 | Comparative Example 1 |
| Color Development-Discharge Operation Test | Good | Good | Good | Good | Poor |

It is clear from Table 4 that the electrochromic elements according to Examples 6-9 each performed a normal color development-discharge operation.

By contrast, the electrochromic element according to Comparative Example 3 did not perform a normal color development-discharge operation because the first electrochromic layer had been detached from the first electrode.

Example 10

The procedure in Example 6 was repeated except that the 2% (by mass) 2,2,3,3-tetrafluoropropanol solution of the compound having the formula (iii) was not applied onto the titanium oxide particle film formed on the second electrode. Thus, an electrochromic element according to Example 10 was prepared. The color development-discharge operation test was performed in the same manner as in Example 6. The results are presented in Table 5.

Comparative Example 4

The procedure in Comparative Example 3 was repeated except that the 2% (by mass) 2,2,3,3-tetrafluoropropanol solution of the compound having the formula (iii) was not applied onto the titanium oxide particle film formed on the second electrode. Thus, an electrochromic element according to Comparative Example 4 was prepared. The color development-discharge operation test was performed in the same manner as in Comparative Example 3. The results are presented in Table 5.

TABLE 5

|  | Example 10 | Comparative Example 4 |
|---|---|---|
| First Electrochromic layer + First Electrode | Example 1 | Comparative Example 1 |
| Color Development-Discharge Operation Test | Good | Poor |

It is clear from Table 5 that the electrochromic element according to Example 10 performed a normal color development-discharge operation.

By contrast, the electrochromic element according to Comparative Example 4 did not perform a normal color development-discharge operation because the first electrochromic layer had been detached from the first electrode.

Example 11

Preparation of Electrochromic Element
An electrochromic element was prepared as follows.
First Electrode
An ITO glass substrate (having an area of 40 mm×40 mm, a thickness of 0.7 mm, and an ITO film thickness of about 100 nm) was used as a first substrate and a first electrode.

Second Electrode
A titanium oxide nano particle dispersion liquid (SP210 available from Showa Titanium Co., Ltd., having an average particle diameter of about 20 nm) was applied onto an ITO glass, the same substrate as the first electrode, by spin coating, and subjected to an annealing treatment at 120° C. for 15 minutes. Thus, a second electrode having a titanium oxide particle film was formed. The second electrode was used as a porous electrode.

Preparation of Blank Cell
The first electrode and the second electrode were laminated with a film having an average thickness of 30 μm sandwiched therebetween. The first electrode and the second electrode were then bonded together through two sides thereof with a UV delay-curing adhesive (PHOTOLEC E, low WVTR (Water Vapor Transmission Rate) type, available from Sekisui Chemical Co., Ltd.), and the film was drawn out thereafter. Thus, a blank cell was prepared.

Formation of Color Developing Layer
A color developing layer composition was prepared in the same manner as in Example 5 except for excluding propylene carbonate. The blank cell was carefully filled with the color developing layer composition without generating undesirable bubbles therein.

The procedures in Example 6 for curing the color developing layer and bonding the first and second electrodes were repeated thereafter. Thus, an electrochromic element according to Example 11 was prepared.

The color development-discharge operation test was performed in the same manner as in Example 6. The results are presented in Table 6.

Comparative Example 5

The procedure in Example 11 was repeated except for changing the content of PEG400DA from 45 parts by mass to 50 parts by mass, and excluding the compound having an adsorption group adsorptive to the first electrode (KAYAMER PM-21 available from Nippon Kayaku Co., Ltd.). Thus, an electrochromic element according to Comparative Example 5 was prepared. The cross-cut adhesion test was performed in the same manner as in Example 11.

The color development-discharge operation test was performed in the same manner as in Example 6. The results are presented in Table 6.

TABLE 6

| Composition (parts by mass) | Example 11 | Comparative Example 5 |
|---|---|---|
| Ethyl Viologen | 1 | 1 |
| PEG400DA | 45 | 50 |
| PM-21 | 5 | — |
| EMIMFSI | 10 | 10 |
| IRGACURE 184 | 5 | 5 |
| Color Development-Discharge Operation Test | Good | Poor |

It is clear from Table 6 that the electrochromic element according to Example 11 performed a normal color development-discharge operation.

By contrast, the electrochromic element according to Comparative Example 5 did not perform a normal color development-discharge operation because the first electrochromic layer had been detached from the first electrode.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. An electrochromic element comprising:
    a first electrode;
    a second electrode facing the first electrode with a gap therebetween; and
    a color developing layer disposed between the first electrode and the second electrode, the color developing layer comprising:
        a first electrochromic layer in contact with the first electrode; and
        an electrolyte layer comprising an electrolyte, wherein the first electrochromic layer comprises:
            a first electrochromic compound that develops and discharges color by a redox reaction, and that develops color by an oxidation reaction; and
            a compound having an adsorption group adsorptive to the first electrode,
        wherein each of the first electrochromic compound and the compound having an adsorption group has a polymerizable functional group, and
        wherein the first electrochromic layer comprises a copolymer of the first electrochromic compound and the compound having an adsorption group.

2. The electrochromic compound of claim 1, wherein the first electrochromic compound comprises a polymerizable compound having a triarylamine structure.

3. The electrochromic element of claim 1, wherein the color developing layer further comprises a second electrochromic layer in contact with the second electrode,
    wherein the second electrochromic layer comprises a second electrochromic compound that develops color by a reduction reaction.

4. The electrochromic element of claim 3, wherein the second electrochromic compound comprises at least one of a viologen compound and a dipyridine compound.

5. The electrochromic element of claim 1, wherein the adsorption group adsorptive to the first electrode is a phosphate group.

6. The electrochromic element of claim 1, wherein the first electrode comprises indium tin oxide.

* * * * *